US008854812B2

(12) United States Patent
Fan

(10) Patent No.: US 8,854,812 B2
(45) Date of Patent: Oct. 7, 2014

(54) ANTI-THEFT DEVICE AND METHOD AND RELATED COMPUTER SYSTEM

(75) Inventor: Chin-Lung Fan, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 282 days.

(21) Appl. No.: 13/450,459

(22) Filed: Apr. 18, 2012

(65) Prior Publication Data

US 2013/0021748 A1 Jan. 24, 2013

(30) Foreign Application Priority Data

Jul. 18, 2011 (TW) .................................. 100125278

(51) Int. Cl.
*G06F 1/16* (2006.01)
*G06F 21/88* (2013.01)
*G06F 21/81* (2013.01)

(52) U.S. Cl.
CPC ................ *G06F 21/81* (2013.01); *G06F 21/88* (2013.01)
USPC .................. 361/679.58; 361/679.26; 70/57.1; 70/80

(58) Field of Classification Search
USPC .................................................. 361/679.58
See application file for complete search history.

(56) References Cited

U.S. PATENT DOCUMENTS

| 5,434,562 | A | * | 7/1995 | Reardon .......................... 726/34 |
| 5,854,736 | A | * | 12/1998 | Fuhs et al. ............... 361/679.57 |
| 5,859,968 | A | * | 1/1999 | Brown et al. .................... 726/36 |
| 6,137,409 | A | * | 10/2000 | Stephens .................... 340/568.1 |
| 7,305,714 | B2 | * | 12/2007 | Hamaguchi et al. ............. 726/34 |
| 7,581,417 | B1 | * | 9/2009 | Chen ................................. 70/57 |
| 2006/0192653 | A1 | * | 8/2006 | Atkinson et al. ............. 340/5.61 |
| 2008/0022138 | A1 | * | 1/2008 | Huang et al. .................. 713/300 |
| 2008/0223090 | A1 | * | 9/2008 | Liao ................................. 70/58 |
| 2009/0027201 | A1 | * | 1/2009 | Chen .......................... 340/568.2 |
| 2010/0180132 | A1 | | 7/2010 | Wu |
| 2012/0223837 | A1 | * | 9/2012 | Hutzler et al. ............. 340/568.1 |

FOREIGN PATENT DOCUMENTS

TW 201027318 7/2010

OTHER PUBLICATIONS

Office action mailed on Nov. 13, 2013 for the Taiwan application No. 100125278, filing date: Jul. 18, 2011, p. 1 line 12-14 and p. 2 line 1-10.

* cited by examiner

*Primary Examiner* — Anthony Q Edwards
(74) *Attorney, Agent, or Firm* — Winston Hsu; Scott Margo

(57) ABSTRACT

The present invention discloses an anti-theft device for a computer system includes a lock; a slot formed on a housing of the computer system for fixing the lock; and a switching module for cutting off power supply for a plurality of external interfaces of the computer system when the lock is fixed to the slot.

11 Claims, 6 Drawing Sheets

US 8,854,812 B2

ANTI-THEFT DEVICE AND METHOD AND RELATED COMPUTER SYSTEM

BACKGROUND OF THE INVENTION

1. Field of the Invention

The present invention relates to an anti-theft device, an anti-theft method and a related computer system, and more particularly, to an anti-theft device, an anti-theft method and a related computer system capable of providing anti-theft mechanisms of both mechanical locking and information assurance.

2. Description of the Prior Art

With advance of technology, functions of a computer system become more and more powerful, and the computer system has become essential an electronic product for human life. In such a condition, an anti-theft mechanism of the computer system becomes more and more important, especially for a portable computer system, such as a notebook, a tablet, etc.

Taking a notebook as an example, a common anti-theft mechanism is Kensington Security Slot, also named K-Slot or Kensington lock, designed on a small opening on a housing of the notebook, for fixing a lock. The lock is connected with a steel cable wrapped in plastic, and the end of the steel cable is fixed to an object hard to be moved, such as a desk, a display cabinet, etc. As a result, after the lock is fixed to the slot, the notebook can be seen as fixing to the desk or the display cabinet. Therefore, showrooms of stores of notebooks usually utilize the Kensington Security Slots as the anti-theft mechanism of display machines.

However, the Kensington Security Slot is not an ideal anti-theft mechanism, because the Kensington Security Slot just fixes the notebook, but cannot avoid interested parties stealing data from the notebook or embedding malicious programs, e.g. Trojan house, computer virus, etc., through external interfaces, e.g. USE, E-SATA, etc., of the notebook. Therefore, there is a need to improve the anti-theft mechanism of the prior art Kensington Security Slot.

SUMMARY OF THE INVENTION

Therefore, the present invention mainly provides an anti-theft device and method and a related computer system.

The present discloses an anti-theft device for a computer system, comprising a lock; a slot, forming on a housing of the computer system; and a switching module, for cutting off power supply for a plurality of external interfaces of the computer system when the lock is fixed to the slot.

The present invention further discloses an anti-theft method for a computer system, comprising forming a slot on a housing of the computer system, forming a lock corresponding to the slot, and cutting off power supply for a plurality of external interfaces of the computer system when the lock is fixed to the slot.

The present invention further discloses a computer system, comprising a housing; a plurality of external interfaces; a power supply device, for outputting power required by operations of the computer system; and an anti-theft device, comprising a lock; a slot, formed on the housing for fixing the lock; and a switching module, for cutting off power supply for the plurality of external interfaces of the computer system when the lock is fixed to the slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
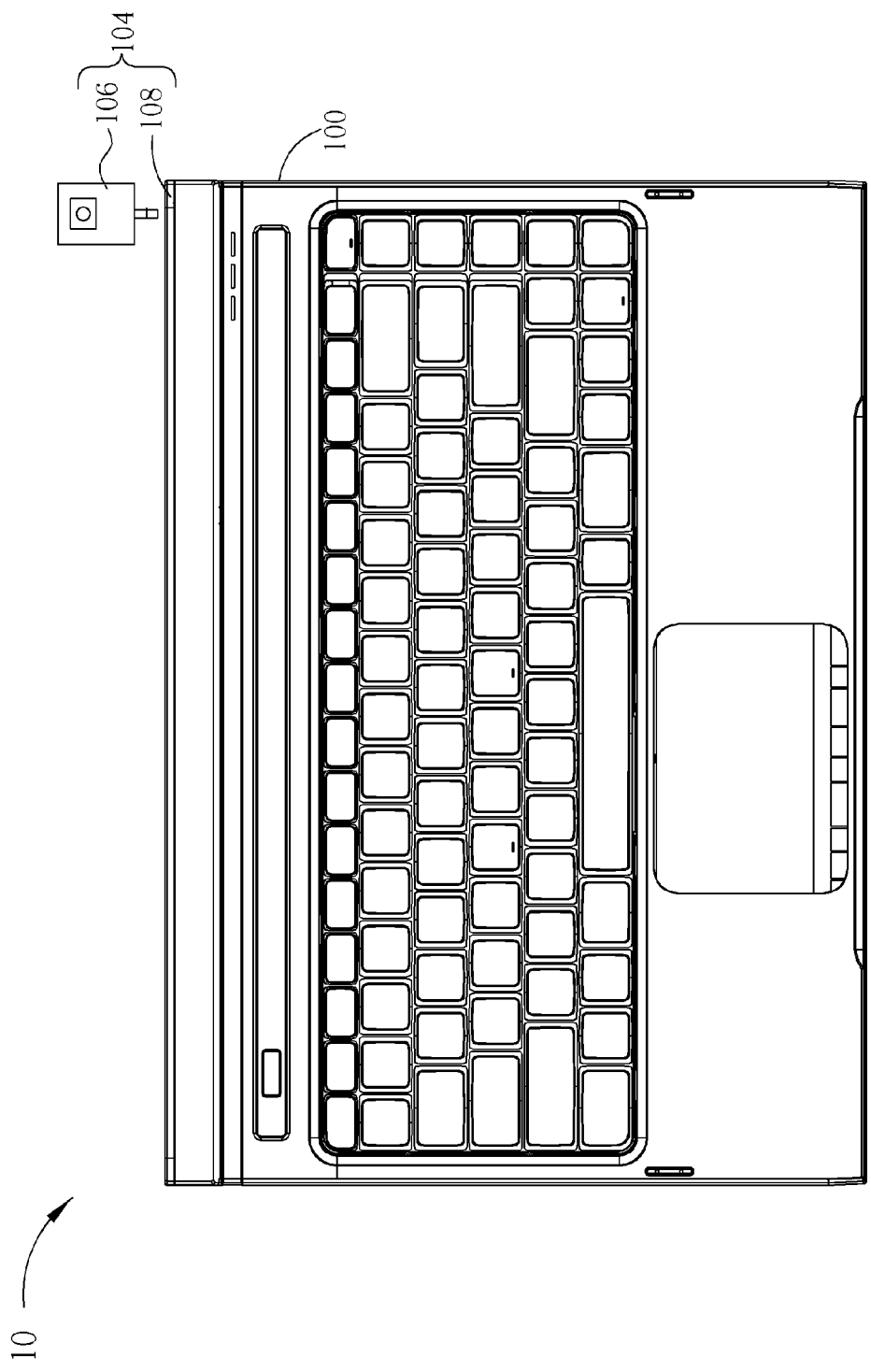
FIG. 1A illustrates a schematic diagram of a top view of a computer system according to an embodiment of the present invention.
Figure 1B:
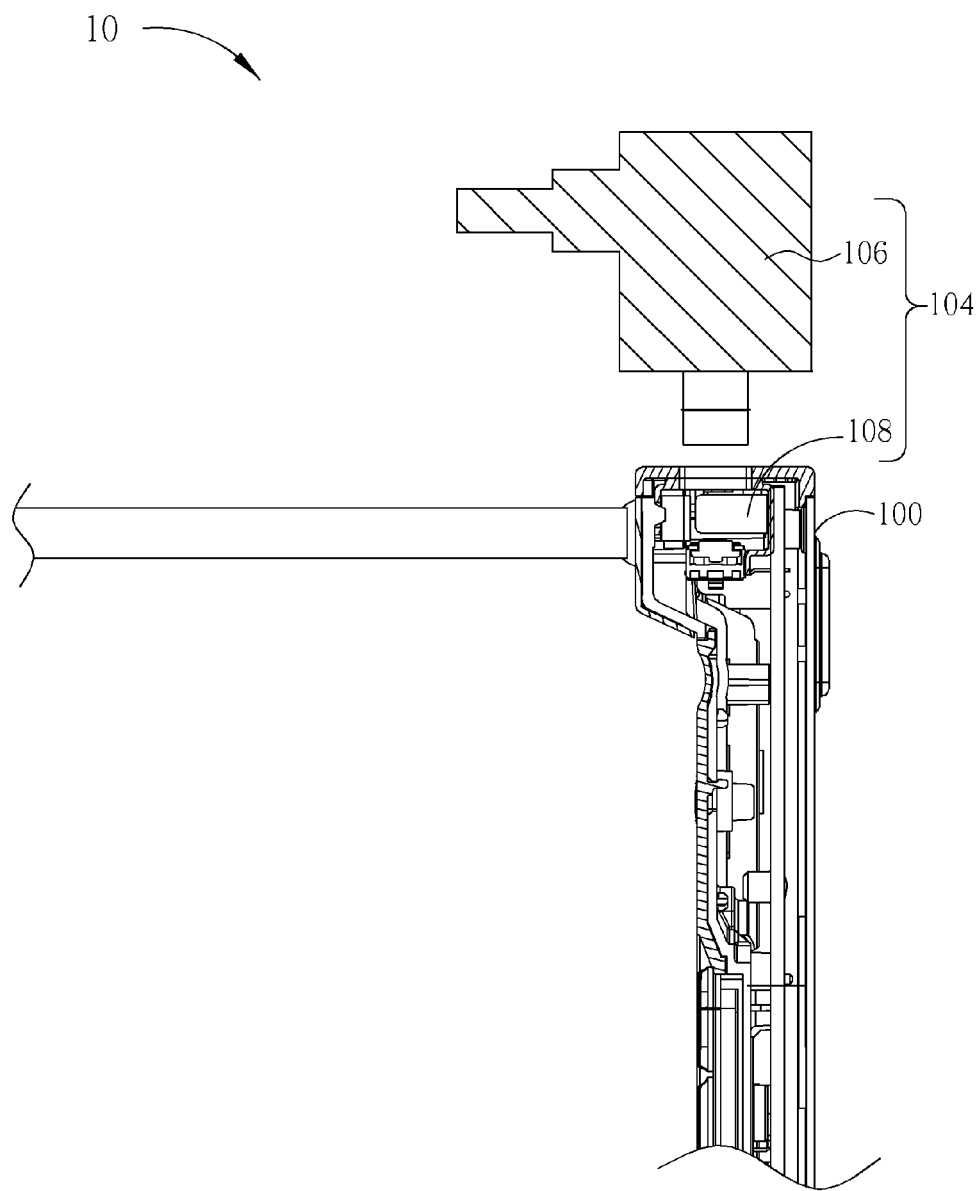
FIG. 1B illustrates a schematic diagram of a cross-section view of the computer system shown in FIG. 1A.
Figure 1C:
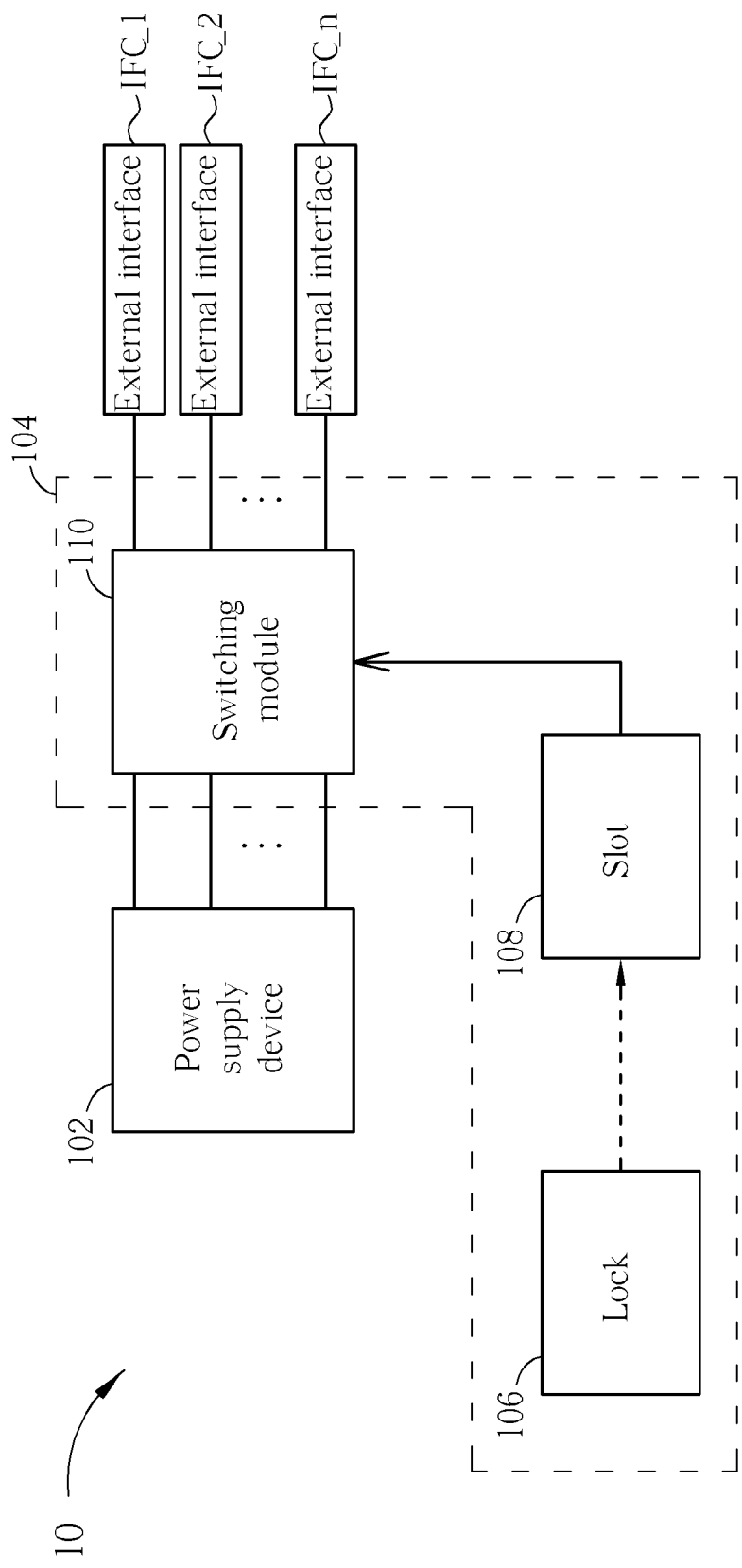
FIG. 1C illustrates a functional block diagram of the computer system shown in FIG. 1A.

Please refer to FIG. 1A to FIG. 1C. FIG. 1A and FIG. 1B are schematic diagrams of a top view and a cross-section view of a computer system 10 according to an embodiment of the present invention, respectively, and FIG. 1C is a functional block diagram of the computer system 10. The computer system 10 is a notebook, and achieves dual anti-theft mechanisms via an anti-theft device 104. Specifically, the anti-theft 104 consists of a lock 106, a slot 108 and a switching module 110. The lock 106 has a shape relative to a shape of the slot 108, for allowing the lock 106 to be completely fixed to the slot 108. The lock 106 can be further connected with a steel cable, and the end of the steel cable can be fixed to an object hard to be moved, e.g. a desk, a display cabinet, etc. Besides, the anti-theft device 104 can cut off power supply from a power supply device 102 of the computer system 10 to external interfaces IFC_1-IFC_n when the lock 106 is fixed to the slot 108. In such a condition, after the lock 106 is fixed to the slot 108, not only the computer system 10 is fixed to the desk or the display cabinet, but power supply for the external interfaces IFC_1-IFT_n is cut off. As a result, interested parties cannot steal data from the computer system 10 or embed malicious programs, such as Trojan house, computer virus, etc., to the computer system 10 through the external interface IFC_1-IFT_n.

Briefly speaking, the anti-theft device 104 provides two anti-theft mechanisms including mechanical locking and information assurance, to avoid the possibility of the computer system 10 being directly stole, and effectively prevent the possibility of internal data of the computer system 10 being copied or destroyed when the lock 106 is fixed to the slot 108. Noticeably, the anti-theft device 104 shown in FIG. 1A to FIG. 1C is an embodiment of the present invention, and all the alternations thereof belong to the scope of the present invention. For example, the material, shape, fixing method of the lock 106 and the slot 108 are not limited, and all the alternations thereof are well known to those skilled in the art. The external interfaces IFC_1-IFC_n can be common external interfaces, such as universal series bus (USB), RJ45, wireless network interface cards, IEEE 1394, E-SATA, etc. Moreover, the main concept of the present invention is switching power supply for the external interfaces IFC_1-IFC_n according to the fixing status of the lock 106 corresponding to the slot 108, and therefore, the status of power supply, such as voltage and current, of the external interfaces IFC_1-IFC_n can be the same or different, and different embodiments can be generated accordingly.

Figure 2:
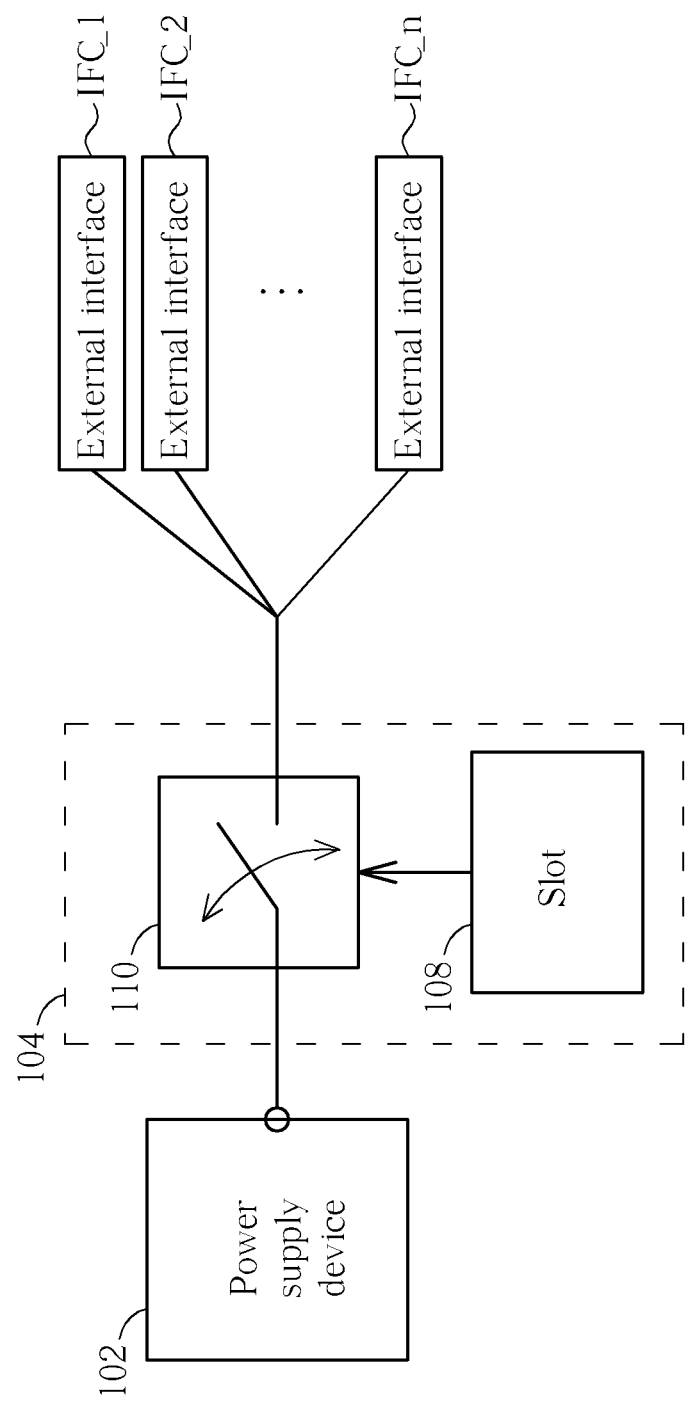
FIG. 2 illustrates a schematic diagram of an embodiment of a switching module shown in FIG. 1C.

For example, if power formats required by the external interfaces IFC_1-IFC_n are the same, e.g. 5V and 1 mA, the switching module 110 can be implemented by a switch between the power supply device 102 and the external interfaces IFC_1-IFC_n, as shown in FIG. 2. The method of the switch (i.e. the switching module 110) switching the connection between the power supply device 102 and the external interfaces IFC_1-IFC_n can be a mechanism method. In other words, when the lock 106 is fixed to the slot 108, the switch synchronously switches the connection from a connected mode to a cut-off mode, and accordingly cuts off power supply from the power supply device 102 to the external interfaces IFC_1-IFC_n. In addition to the mechanism method, the switch can be implemented by a signal control method. In other words, when the lock 106 is fixed to the slot 108, a signal is generated for the switch shown in FIG. 2 (i.e. the switching module 110), such that the switch switches from the connected mode to the cut-off mode. The generating method of the signal is not limited to any principle, e.g. the generating method of the signal can be a pulse signal, a magnetic signal, an infrared interdiction signal, etc.

Besides, FIG. 2 explains one of the feasible implementation methods of the switching module 110 when the power formats required by the external interfaces IFC_1-IFC_n are the same. However, if the power formats required by the external interfaces IFC_1-IFC_n are different, the switching module 110 can be implemented by multiple switches respectively controlling the connections between the power supply device 102 and each of the external interfaces IFC_1-IFC_n, and the control of each switch is synchronous with the fixing status of the lock 106. Such derivation or analogy should be well known to those skilled in the art, and is not narrated hereinafter.

Figure 3:
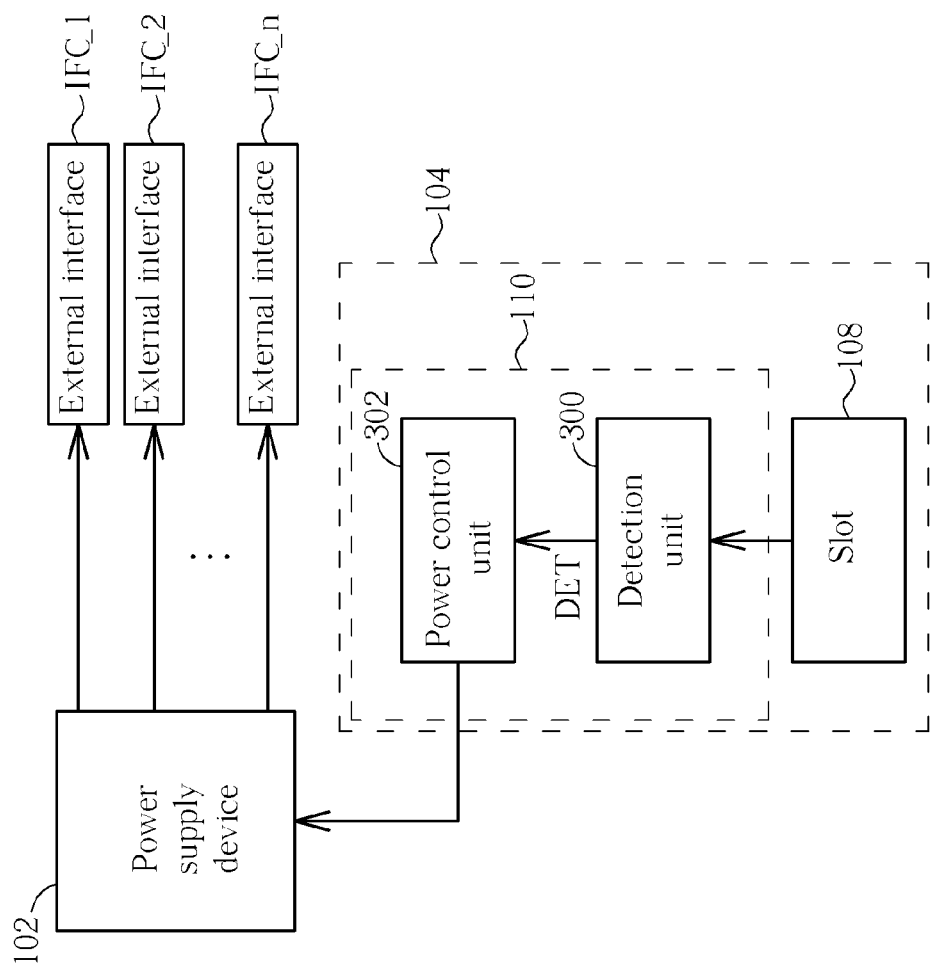
FIG. 3 illustrates a schematic diagram of another embodiment of the switching module shown in FIG. 1C.

In addition to implementation of switches, the switching module 110 can be achieved by controlling the power supply device 102. For example, please refer to FIG. 3, which illustrates a schematic diagram of an embodiment of the switching module 110. As shown in FIG. 3, the switching module 110 comprises a detection unit 300 and a power control unit 302. The detection unit 300 detects the fixing status of the lock 106 corresponding to the slot 108, to generate a detection result DET. When the detection result DET indicates the lock 106 is fixed to the slot 108, the power control unit 302 cuts off power supply from the power supply device 102 to the external interfaces IFC_1-IFC_n according to the detection result DET.

The main concept of the switching module 110 shown in FIG. 3 is cutting off power supply from the power supply device 102 to the external interfaces IFC_1-IFC_n when the lock 106 is fixed to the slot 108 through controlling the power supply device 102, and different alternations can be accordingly observed. For example, in the FIG. 3, multiple connections between the power supply device 102 and the external interfaces IFC_1-IFC_n represent the power formats required by the external interfaces IFC_1-IFC_n can be different.

However, if the power formats required by the external interfaces IFC_1-IFC_n are the same, the multiple connections can be simplified into one-to-multiple connection method, and are not limited thereto.

Figure 4:
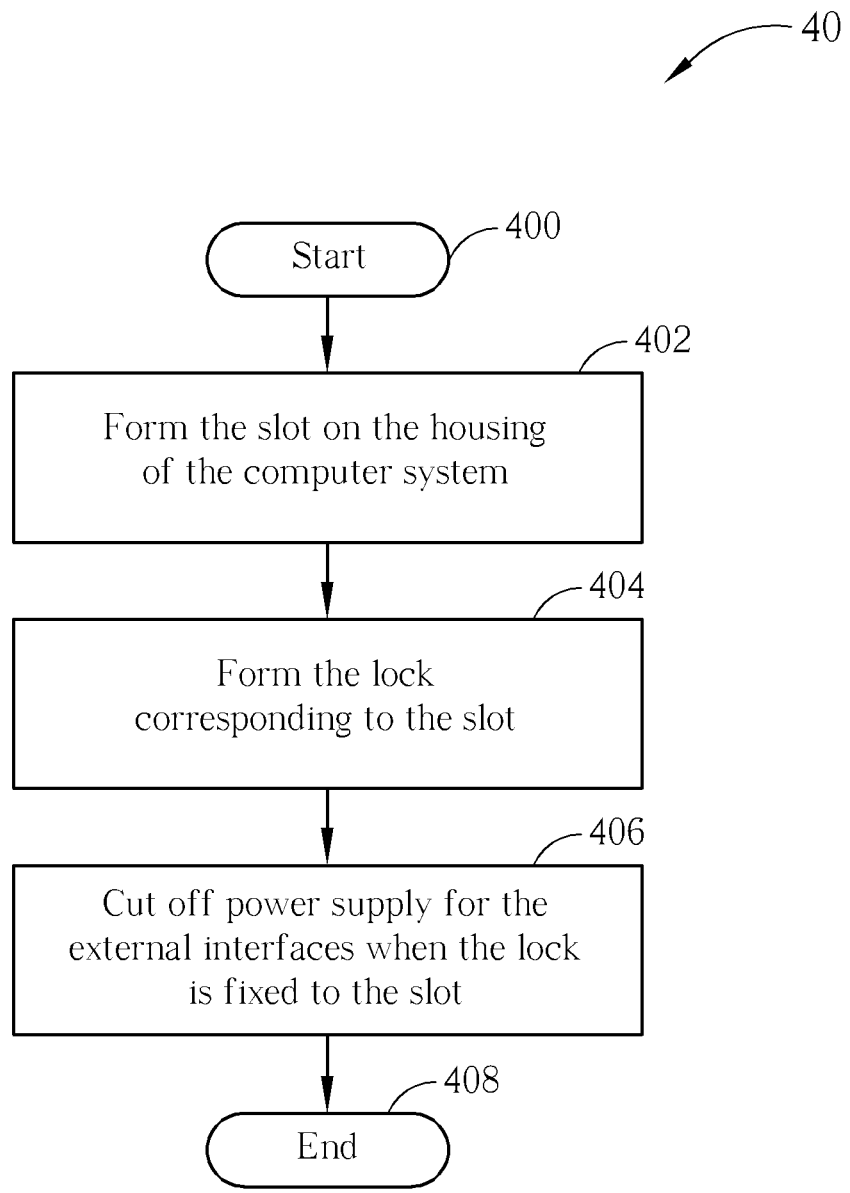
FIG. 4 illustrates a schematic diagram of an anti-theft process according to an embodiment of the present invention.

As can be seen from the above, via the anti-theft device 104, the switching module 110 cuts off the power supply from the power supply device 102 to the external interfaces IFC_1-IFC_n when the lock 106 is fixed to the slot 108, and therefore, the anti-theft device 104 not only avoids the computer system 10 being directly stole, but effectively prevents the internal data of the computer system 10 being stole or destroyed. The above mentioned operating concept of the anti-theft device 104 can be further summarized into an anti-theft process 40, as shown in FIG. 4. The anti-theft process 40 comprises the following steps:

Step 400: Start
Step 402: Form the slot 108 on the housing 100 of the computer system 10.
Step 404: Form the lock 106 corresponding to the slot 108.
Step 406: Cut off power supply for the external interfaces IFC_1-IFC_n when the lock 106 is fixed to the slot 108.
Step 408: End.

The detailed description or alternations of the anti-theft process 40 can refer to the above, and are not narrated hereinafter for simplicity.

In the prior art, the Kensington lock only fixes the notebook, but cannot avoid interested parties stealing data in the notebook or embedding malicious programs, e.g. Trojan house, computer virus, etc., though the external interfaces of the notebook. In comparison, in the present invention, when the lock 106 is fixed to the slot 108, the switching module 110 cuts off power supply from the power supply device 102 to the external interfaces IFC_1-IFC_n, so as to avoid the computer system 10 being directly stole, and effectively prevent internal data of the computer system 10 being stole or destroyed.

To sum up, the anti-theft device of the present invention features dual anti-theft mechanisms of mechanical locking and information assurance, avoids the computer system being directly stole, and effectively prevents internal data of the computer system being stole or destroyed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An anti-theft device for a computer system, comprising:
   a lock, configured to confine the computer system within an area;
   a slot, formed on a housing of the computer system for fixing the lock; and
   a switching module, for cutting off power supply for a plurality of external interfaces of the computer system when the lock is fixed to the slot, wherein a pulse signal, a magnetic signal or an infrared interdiction signal is generated for the switching module to cut off power supply;
   wherein the plurality of external interfaces are selected from a universal series bus (USB), an RJ45, a wireless network interface card, an IEEE 1394 and an External Serial Advanced Technology Attachment (E-SATA).

2. The anti-theft device of claim 1, wherein the switching module maintains power supply for the plurality of the external interfaces when the lock is not fixed to the slot.

3. The anti-theft device of claim 1, wherein the switching module comprises a switch between a power supply device of the computer system and the plurality of external interfaces, and the lock disconnects the switch when the lock is fixed to the slot, to cut off power supply for the plurality of external interfaces.

4. The anti-theft device of claim 1, wherein the switching module comprises:
   a detection unit, for detecting a fixing status of the lock corresponding to the slot; and a power control unit, for cutting off power supply for the plurality of external interfaces when the lock is fixed to the slot.

5. An anti-theft method for a computer system, comprising:
   forming a slot on a housing of the computer system;
   forming a lock corresponding to the slot, wherein the lock is configured to confine the computer system within an area; and
   cutting off power supply for a plurality of external interfaces of the computer system when the lock is fixed to the slot, wherein a pulse signal, a magnetic signal or an infrared interdiction signal is generated to cut off power supply;
   wherein the plurality of external interfaces are selected from a universal series bus (USB), an RJ45, a wireless network interface card, an IEEE 1394 and an External Serial Advanced Technology Attachment (E-SATA).

6. The anti-theft method of claim 5, further comprising maintaining power supply for the plurality of external interfaces when the lock is not fixed to the slot.

7. The anti-theft method of claim 5, wherein the step of cutting off power supply for the plurality of external interfaces of the computer system when the lock is fixed to the slot comprises:
   detecting a fixing status of the lock corresponding to the slot, to generate a detection result; and
   cutting off power supply for the plurality of external interfaces when the detection result indicates that the lock is fixed to the slot.

8. A computer system, comprising:
   a housing;
   a plurality of external interfaces, selected from a universal series bus (USB), an RJ45, a wireless network interface card, an IEEE 1394 and an External Serial Advanced Technology Attachment (E-SATA);
   a power supply devices, for outputting power required by operations of the computer system; and
   an anti-theft device, comprising:
      a lock, configured to confine the computer system within an area;
      a slot, formed on the housing for fixing the lock; and
      a switching module, for cutting off power supply from the power supply device to the plurality of external interfaces when the lock is fixed to the slot, wherein a pulse signal, a magnetic signal or an infrared interdiction signal is generated for the switching module to cut off power supply.

9. The computer system of claim 8, wherein the switching module maintains power supply from the power supply device to the plurality of external interfaces when the lock is not fixed to the slot.

10. The computer system of claim 8, wherein the switching module comprises a switch between the power supply device and the plurality of external interfaces, and the lock disconnects the switch when the lock is fixed to the slot, to cut off power supply from the power supply device to the plurality of external interfaces.

11. The computer system of claim 8, wherein the switching module comprises:
   a detection unit, for detecting a fixing status of the lock corresponding to the slot, to generate a detection result; and
   a power control unit, for cutting off power supply from the power supply device to the plurality of external interfaces when the detection result instructs the lock is fixed to the slot.

* * * * *